United States Patent [19]

LeVan

[11] 4,281,476
[45] Aug. 4, 1981

[54] WINDOW ASSEMBLY HAVING A SINGLE BENDABLE GLASS PANEL

[76] Inventor: Eugene B. LeVan, 15858 El Paseo Dr., Whittier, Calif. 90603

[21] Appl. No.: 88,335

[22] Filed: Oct. 26, 1979

[51] Int. Cl.³ .............................................. E05F 13/00
[52] U.S. Cl. .......................................... 49/34; 49/465
[58] Field of Search .................. 49/34, 141, 371, 463, 49/465; 98/2.12, 2.14

[56] References Cited

U.S. PATENT DOCUMENTS

| | | | |
|---|---|---|---|
| 2,087,777 | 7/1937 | Morrison | 49/371 |
| 3,398,483 | 8/1968 | Ringel et al. | 49/34 |
| 3,521,403 | 7/1970 | Bouwkamp | 49/34 X |
| 4,130,966 | 12/1978 | Kujawa, Jr. et al. | 49/141 |

FOREIGN PATENT DOCUMENTS 531577 1/1941 Fed. Rep. of Germany ............. 49/34

*Primary Examiner*—Kenneth Downey
*Attorney, Agent, or Firm*—Francis X. LoJacono

[57] ABSTRACT

A window assembly for vehicles, particularly for use as a rear window associated with truck cabs, the window assembly having a longitudinally elongated assembly frame structure including a continuous inner seal adapted to engage a longitudinally elongated window panel formed from tempered glass which is removably mounted to the frame structure by an upper and a lower keeper member, the keeper members being positioned intermediate the longitudinal frame members and a pair of detachable latching units provided at each free end of the glass panel, thereby allowing each end section of the panel to be flexed or bent to an open-wing position.

12 Claims, 6 Drawing Figures

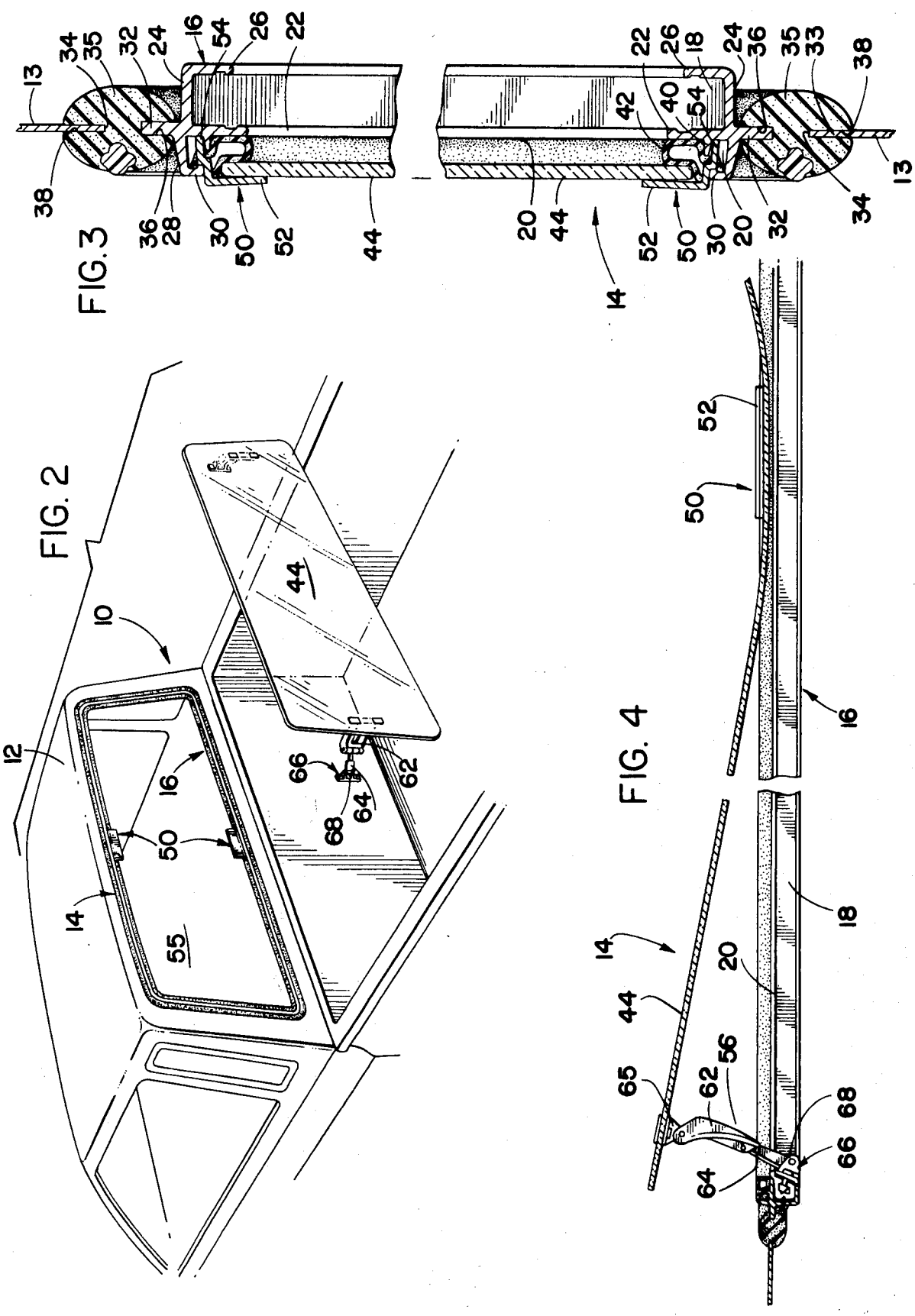

WINDOW ASSEMBLY HAVING A SINGLE BENDABLE GLASS PANEL

BACKGROUND OF THE INVENTION

1. Field of the Invention

This invention relates generally to window assemblies, and more particularly to window assemblies for use in vehicles wherein the window panel is arranged to be flexed or bent at each end thereof to create a wing-like opening; and, in addition, the window panel is mounted so as to be removed from the frame structure—thus leaving a clear or free access into or out of the vehicle.

2. Description of the Prior Art

As is well known in the art, various problems and difficulties are encountered in providing suitable window assemblies in vehicles — particularly in the rear wall of truck cabs—for affording positive ventilation within the cabs of such vehicles.

The most common window assembly in use today is one having a single fixed window panel which is not removable from the frame structure and is not adapted to be opened to allow free flow of air behind the passenger's and driver's heads.

The second most widely used window assembly comprises a window-frame structure having one or more sliding window sections. However, these window units have features that restrict or limit their use. Some are complicated to install and operate, and most are expensive to manufacture and maintain.

A well known pass-through rear cab window that is used with a camper shell comprises an annular frame structure having two oppositely disposed central sliding panel sections that—when open—slide to either side, thereby overlapping the adjacent fixed window end panels. Thus, air must enter through the center of the window structure; and this does not provide sufficient ventilation or circulation of incoming air flow. Secondly, it restricts the access opening to half or less of the overall window area.

Thus, it will be seen that the herein-disclosed window assembly overcomes the inherent problems of known window structures presently in use.

SUMMARY AND OBJECTS OF THE INVENTION

It is an important object of the present invention to provide a window assembly that can be adapted for several types of vehicles, including boats, and particularly as an ideal pass through rear cab window for both full size pickups and mini trucks. The present window assembly is also designed to be positioned on side walls of van-type vehicles, as well as to be installed as a part of camper shells.

The uniqueness of this window assembly is that it comprises a single sheet of tempered glass mounted to an elongated frame structure which is secured within an opening formed in a vehicle wall, wherein the sheet of glass defines a single panel that is removably secured to the central portion of the fixed annular frame and includes a pair of detachable latching members secured to the free ends of the window panel, the glass panel being detachably attached to the fixed frame.

Thus, it is another object of the invention to provide detachable latching members to allow the window panel to be bent or flexed at one or both free ends, and held in an open-winged position.

It is still another object of the invention to provide a window assembly of this character wherein the latching members can be separated from the fixed window frame, whereby the single elongated panel can be readily removed therefrom—thus providing a fully unobstructed pass-through opening.

It is a further object of the present invention to provide a window assembly having flexible wing-like end sections, allowing a maximum and direct circular flow of air to enter into the vehicle from the outer ends of the window assembly.

It is still a further object of the invention to provide an assembly of this character that allows the window panel to be readily removed by sliding it from one end to the other, whereby relatively few operating parts are required.

Still another object of the invention is to provide a device of this type that is simple and rugged in construction, and that is inexpensive to manufacture.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements or modes of operation that are properly within the scope of the appended claims.

BRIEF DESCRIPTION OF THE DRAWINGS

FIG. 2 is another pictorial view of the pickup-truck cab wherein the glass window panel is shown fully removed from the fixed-frame structure, thus allowing free access into or out of the cab;

FIG. 3 is a vertical cross-sectional view taken substantially along line 3—3 of FIG. 1, showing the glass panel secured by an upper and a lower keeper means;

FIG. 4 is a longitudinal cross-sectional view of one open-wing section taken substantially along line 4—4 of FIG. 1;

DESCRIPTION OF THE PREFERRED EMBODIMENT

Figure 1:
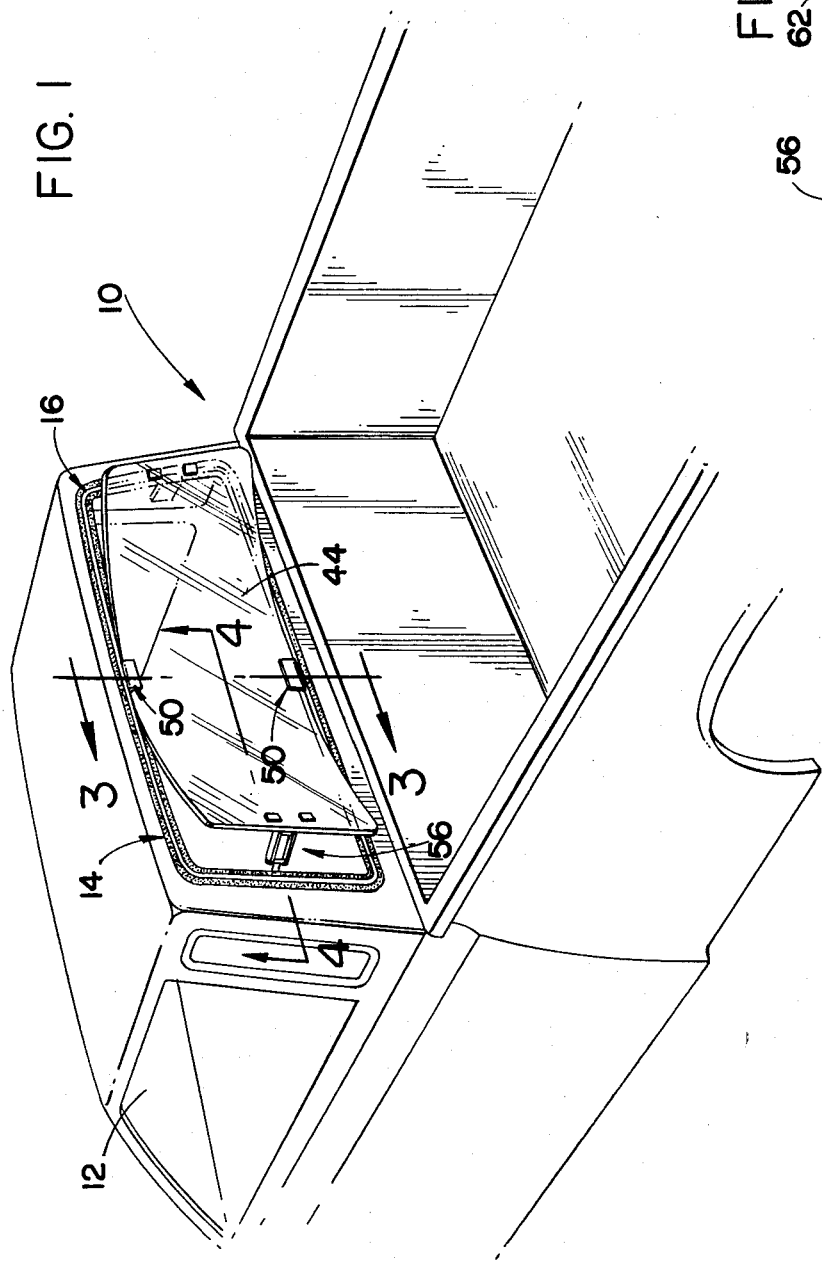
FIG. 1 is a pictorial view of a pickup-truck cab having the present window assembly mounted therein and illustrating both wing sections of the glass window panel in an open mode, the panel being secured to the fixed window frame intermediate the ends thereof.

Referring more particularly to FIG. 1, there is shown a pickup truck generally indicated at 10 having a cab section 12 in which the driver and passenger, or passengers, occupy.

As is well known, cab sections of this character are provided with an opening formed in a rear wall 13 wherein a rear window is mounted, the rear window normally being a single fixed panel. However, due to individual requirements, these single fixed assemblies are often removed and replaced by window assemblies that are arranged to be opened by means of sliding sections adapted to be removed.

With respect to the removable panel-type window assembly, it should be recognized that the present herein-disclosed invention can be adapted to other types of vehicles, such as passenger cars, vans, boats, etc.

Figure 5:
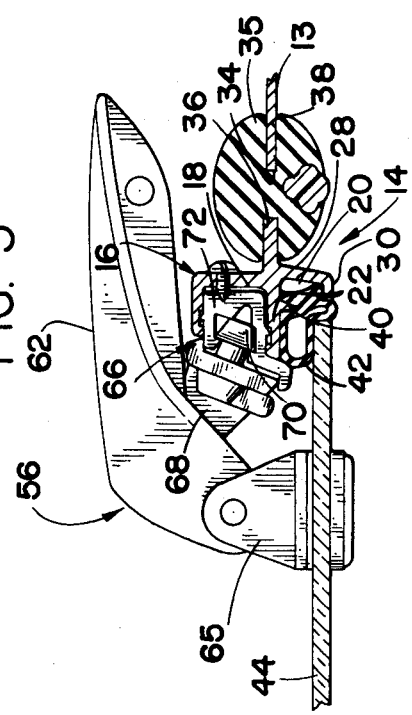
FIG. 5 is a cross-sectional view taken just above the detachable latching device, showing the window panel in a closed and locked mode.

The window assembly, generally indicated at 14, comprises a frame structure 16 of an extruded aluminum molding having a first inner channel 18 and a second outer channel 20 divided by a centrally positioned wall 22. Thus, central wall 22, bottom wall 24, and inner side wall 26 define channel 18; while central wall 22, bottom wall 28, and outer wall 30 define outer channel 20. This can be seen in FIGS. 3 and 5 which further show an annular flange member 32 extending outwardly therefrom. This flange allows the window assembly 14 to be mounted in the rear wall opening 34 of the cab. There are several methods of mounting a window assembly within opening 34; and one method thereof is shown herein as comprising a molded rubber member 35 having an inner annular slot 36 to receive the corresponding annular flange member 32 of frame structure 16, and having an outer slot 38 to receive edge 33 of opening 34.

Accordingly, the window-frame assembly is securely fixed to the vehicle about its total annular configuration, which in this application is formed having a generally elongated rectangular shape wherein the longitudinal length is greater than the width thereof. It should be also noted that the frame structure can be made from a single elongated piece joined at one point; or it can be made in two sections clamped together to provide a single closed frame member.

Outer channel 20 further includes an inner lip member 40 projecting inwardly from said central wall 22, whereby a continuous sealing means defined by a gasket member 42 is attached to lip member 40 and held in channel 20, so as to engage the single glass panel 44 when in a closed mode. The single glass panel has a configuration that is the same as that of the frame structure—that is, its length must be greater than its width. Preferably, the length of the glass panel should be four (4) to five (5) times greater than its width. The greater the length-to-width ratio, the greater flexibility is made possible along the longitudinal length of the panel—thus allowing for a greater arc to be formed when bending or flexing either or both sides of the panel.

Figure 6:
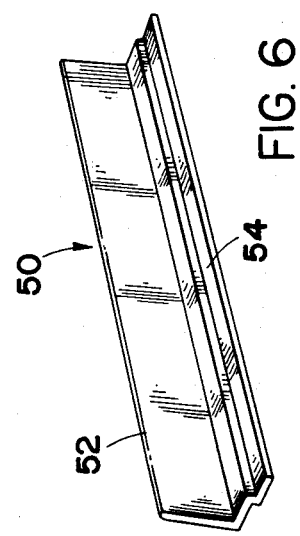
FIG. 6 is a perspective view of the keeper member.

It is further recommended that the glass be of the tempered type and secured at its approximate center to the frame structure by means of a keeper member 50. That is, a pair of keeper means defined by keeper members 50 having substantially "L"-shaped configurations, as seen in FIG. 6, are mounted to the oppositely disposed longitudinal portions of frame 16. Keeper 50 comprises a flat upright wall member 52 and an offset lower horizontal wall member 54 which is adapted to be wedged between lip 40 and outer wall 30 of the outer channel 20, gasket 42 being interposed between flat upright wall 52 and central wall 22 of frame 16.

Thus, it can be seen that the upper and lower edges of panel 44 are clamped between the respective upper and lower keeper members and gasket 42. When the outer ends of the panel are free, the panel can be moved longitudinally at either end, and removed from the keepers and frame structure as shown in FIG. 2—whereby an unobstructed passage is provided for ingress into or egress from the vehicle through the window opening 55.

Each free end of the glass panel is provided with a detachable latching means, generally indicated at 56. Various removable or detachable latch means may be employed.

However, the latching device as herein shown is now pending under its own application; and it comprises a toggle jointed latch having a pair of toggle bars, the first toggle bar being defined by a latch handle 62 which is toggle-jointed together with a second toggle arm 64, whereby toggle arm 64 is foldable within handle 62 when in a closed mode (see FIG. 5), both toggle members being fully extended when in an open mode (see FIG. 4). Handle 62 is pivotally connected to a mounting bracket 65, bracket 65 being secured to each free end section of the glass panel 14. Toggle arm 64 is connected to a demountable anchor means 66 comprising an anchor bracket 68 having a pair of locking cleats 70 which are rotatably supported by bracket 68. The cleats 70 are arranged to be locked in lock bar 72 which is secured in the inner channel 18. Thus, each short vertical section of frame structure 16 is adapted with a lock-bar member 72 so as to releasably receive cleat members 70.

When cleats 70 are anchored and locked to lock bar 72, each free end of the glass panel can be locked in a closed mode or flexed to an open mode, as indicated in FIG. 1. The latching device is so arranged that, when fully opened, it will hold the respective wing section in an open vented position against the inwardly biasing force of the bent section. As the latch is moved to close the wing section, it is aided by the biasing force of the bent glass section and will seal tightly against the annular gasket 42.

To remove the window panel from the frame, cleat members 70 are rotated to a released position and the anchor means is separated from the frame structure—thus freeing the ends of panel 44. The panel can then be slidably removed longitudinally from keeper members 50. Accordingly, the reverse is true when the panel is to be replaced.

Hence, a method of constructing such an assembly would include the steps of providing a predetermined configuration for a frame structure wherein the length is substantially greater than the width, the ratio being at least four (4) to one (1); and wherein a tempered glass panel is provided to be removably mounted to the frame structure, the configuration of the opening being defined by said frame structure, whereby the glass panel is secured to the frame at its intermediate point between the free ends of the panel. The free wing ends thereof are provided with detachable latching means which are secured to each wing end and detachably mounted to the adjacent portion of the frame section. A further and important step is flexing or bending each oppositely disposed wing end of the panel, either together or singly, to create a vent opening at each end of the window assembly.

Other steps include detaching the latch means from the frame and sliding the window panel out of the frame assembly, so as to provide an unobstructed pass-through opening into and out of the vehicle.

The invention and its attendant advantages will be understood from the foregoing description; and it will be apparent that various changes may be made in the form, construction and arrangement of the parts of the invention without departing from the spirit and scope thereof or sacrificing its material advantages, the arrangement hereinbefore described being merely by way of example; and I do not wish to be restricted to the specific form shown or uses mentioned, except as defined in the accompanying claims.

I claim:

1. A window assembly adapted to be mounted in a vehicle wall, comprising:
   an annular frame structure adapted to be fixedly mounted within an opening formed in said wall;
   a single glass panel removably supported in said fixed-frame structure and having oppositely disposed free ends, said glass panel being bendable along the longitudinal length thereof, wherein the length thereof is substantially greater than its width;
   means for removably mounting said glass panel to said fixed-frame structure, said means being positioned intermediate said free ends thereof, thus allowing said free ends of said glass panel to be individually bent to an open-wing position;
   a sealing means mounted to said fixed frame structure for sealing engagement with said glass panel; and
   detachable latching means mounted between said fixed-frame structure and said glass panel, said detachable-latching means being secured to each free end of said glass panel and detachably connected to said fixed-frame structure, whereby said glass panel can be fully separated from said window assembly; and
   wherein said fixed-frame structure comprises a pair of parallel continuous channel members defining an outer channel and in inner channel, said outer channel being adapted to receive said sealing means and said mounting means, and said detachable-latching means being adapted to be removably connected to said inner channel.

2. A window assembly as recited in claim 1, wherein said mounting means comprises a pair of keeper bars adapted to be inserted and locked in said outer channel, said keeper bars being oppositely disposed to each other so as to clamp the upper and lower longitudinal edges of said glass panel to said frame structure.

3. A window assembly as recited in claim 2, wherein said frame structure further includes means for mounting said structure to a fixed wall member of a vehicle.

4. A window assembly as recited in claim 3, wherein said inner and outer channels are divided by a central wall, said inner channel being defined by said central wall, a bottom wall, and an inner side wall, and said outer channel being defined by said central wall, a bottom wall, and an outer wall, said central wall including a continuous inner lip member whereby said sealing means is secured in said outer channel.

5. A window assembly as recited in claim 4, wherein said keeper bars comprise a substantially "L"-shaped configuration having an upright wall member and an offset lower horizontal wall member which is adapted to wedge between said central wall and said outer wall member of said outer channel, and wherein said longitudinal edges of said glass panel are positioned between said keeper bar member and said sealing means.

6. A window assembly as recited in claim 1, wherein said detachable latching means comprises:
   a toggle-jointed latch having a pair of interconnected toggle bars;
   a mounting bracket connected to one of said toggle bars and secured to said free end of said glass panel; and
   a demountable anchor means connected to one of said toggle bars and detachably secured to said frame structure.

7. A window assembly adapted to be mounted in a vehicle wall including a removable panel, comprising:
   an annular frame structure adapted to be fixedly mounted within an opening formed in said vehicle wall;
   a single panel removably supported in said fixed-frame structure and having oppositely disposed free ends, said panel being bendable intermediate said free ends thereof;
   means for removably mounting said panel to said annular frame structure, comprising:
   a first keeper member mounted to said frame structure;
   a second keeper member mounted to said frame structure and positioned opposite said first keeper member, so as to be oppositely disposed to each other in order to slidably receive said panel along the upper and lower longitudinal edges of said panel, whereby said panel is adapted to be slidably removed or inserted within said annular frame structure;
   a sealing means mounted to said fixed-frame structure for sealing engagement with said panel; and
   detachable-latching means mounted to each free end of said panel and detachably connected to said fixed-frame structure, whereby said panel can be fully separated from said window assembly.

8. A window assembly as recited in claim 7, wherein said detachable-latching means includes a demountable anchor means adapted to be removably secured to said frame structure, thereby providing an unobstructed pass-through opening into and out of said vehicle where said panel is removed from said frame structure.

9. A window assembly as recited in claim 7, wherein said removable mounting means includes said sealing means wherein said keeper members are juxtaposed thereto to receive said respective longitudinal edges of said panel therebetween.

10. A window assembly as recited in claim 7, wherein said fixed-frame structure comprises a pair of parallel continuous channel members defining an outer channel and an inner channel, said outer channel being adapted to receive said sealing means and said mounting means, and said detachable-latching means being adapted to be removably connected to said inner channel.

11. A method of providing a window assembly having a bendable and removable panel, comprising the steps of:
   forming a window-frame structure having a predetermined elongated configuration, wherein the length thereof is greater than the width;
   mounting said panel to said window-frame structure, wherein said panel is removably attached thereto at an intermediate point between the free ends of said panel, allowing each said free end to be arcuately flexed between an open and closed position;
   providing a detachable-latching mechanism secured to said free ends of said panel, whereby said free ends can be either locked closed or arranged in an open wing-like arcuate position, said detachable-latching mechanism being formed so as to be completely removed from said window-frame structure, thereby providing an unobstructed pass-through opening into and out of said vehicle when said penel is removed from said frame structure.

12. A method as recited in claim 11, wherein said panel is formed of tempered glass.

* * * * *